United States Patent

Takano

(10) Patent No.: US 6,323,428 B1
(45) Date of Patent: *Nov. 27, 2001

(54) PROTECTION STRUCTURE FOR FLEXIBLE FLAT CABLE

(75) Inventor: Yoichi Takano, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 days.

(21) Appl. No.: 09/358,656

(22) Filed: Jul. 26, 1999

(30) Foreign Application Priority Data

Jul. 28, 1998 (JP) .................................................. 10-212062

(51) Int. Cl.$^7$ ...................................................... H01B 7/04
(52) U.S. Cl. .......................................... 174/117 F; 248/51
(58) Field of Search ........................... 174/117 F, 117 R, 174/72 A, 135, 117 FF, DIG. 8; 248/49, 51, 53, 60, 74.2, 78.1; 414/280

(56) References Cited

U.S. PATENT DOCUMENTS

| | | | |
|---|---|---|---|
| 4,787,854 | * | 11/1988 | Le Parquier ........................ 439/67 |
| 4,898,351 | * | 2/1990 | Suzuki ................................... 248/51 |
| 5,016,841 | * | 5/1991 | Schumann et al. ..................... 248/51 |
| 5,084,594 | * | 1/1992 | Cady et al. ..................... 174/117 F X |
| 5,669,749 | * | 9/1997 | Danielson et al. ................. 248/51 X |
| 6,029,437 | * | 2/2000 | Hart ................................... 248/51 X |

FOREIGN PATENT DOCUMENTS

| | | |
|---|---|---|
| 38 43 665 A1 | 7/1989 | (DE) . |
| 296 17 702 U1 | 1/1997 | (DE) . |
| 0 387 585 A1 | 9/1990 | (EP) . |
| 0 490 022 A2 | 6/1992 | (EP) . |
| 937820 | 9/1963 | (GB) . |
| 10-936 | 1/1998 | (JP) . |

* cited by examiner

Primary Examiner—Chau N. Nguyen
(74) Attorney, Agent, or Firm—Armstrong, Westerman, Hattori, McLeland & Naughton, LLP

(57) ABSTRACT

A structure for protecting a flexible flat cable (FFC) is structured so that the FFC and a plate member arranged along it are covered with a heat-shrinkable tube. The structure is provided with fixing portions and for a fixed member and a movable member on both ends. In this configuration, if the movable member is repeatedly moved in a two-dimensional arrangement, the FFC will not buckle, easily deform owing to any external force and wear. This lengthens the life of the FFC greatly.

6 Claims, 4 Drawing Sheets

PROTECTION STRUCTURE FOR FLEXIBLE FLAT CABLE

BACKGROUND OF THE INVENTION

1. Field of the Invention

The present invention relates to a protection structure for a flexible flat cable which is arranged in a single layer or laminated in multiple layers between a fixed member and a movable member which is movable relatively to the fixed member.

2. Description of the Related Art

The flexible flat cable (hereinafter referred to as "FFC"), which has an excellent property for bending or sliding, has been used for the purpose of power supply from the fixed member to the movable member.

However, the FFC itself has no lap. Therefore, if the movable member is repeatedly moved in a two-dimensional arrangement, the FFC may buckle, easily deform owing to any external force and wear. This reduces the life of the FFC greatly. In order to overcome such an inconvenience, several proposals have been made.

For example, in JP-A-10-936, a structure for protection of a harness for power supply (signal line and driving line) is proposed which is arranged in a slide door adopted in a side door of a box type vehicle called "one box car".

This structure intends to overcome difficulty for a long time due to several causes such as swing, twisting, buckling, etc. Referring to FIGS. 6–11, an explanation will be given of the proposed structure.

FIG. 6 shows an entire configuration of the structure for harness protection in a sectional view of a vehicle.

In FIG. 6, reference numeral 130 denotes a car body which is a fixed member; and 102 denotes a slide door which is a movable member. The slide door 102 is provided with a lower arm 121 which extends toward the side of the car body 130. The lower arm 121 is provided with a side roll 122 and a guide roll 123 at its end.

On the side of the car body 130, a lower rail 125 is formed. On the ceiling 126 of the lower rail 125, a guide groove 127 is formed. The guide groove 127, in which the guide roll 123 on the side of the slide door 102 is fit, limits the movement of the slide door 102 in a horizontal direction in FIG. 6. The side roll 122, which is placed on the floor 128 of the lower rail 125, can support the weight of the slide door 102 on the side of the car body 130.

The one end of the flexible conductor 140 is attached to the lower arm 121 on the side of the slide door 102 whereas the other end of the flexible conductor 140 is attached to a back wall 129 of the lower rail 125 on the side of the car body 130.

As shown in FIG. 7 which is a perspective view of the lower arm 121 and flexible conductor 140, the above one end of the flexible conductor 140 is coupled with an L metal fitting 141 through an end plate 152. The L metal fitting 141 is tightened onto the above end of the lower arm 121. The other end of the flexible conductor 140 is tightened to the back wall 129 (FIG. 6) through an end plate 148.

As seen from the front view of FIG. 8, the flexible conductor 140 includes a wiring portion 145 on the car body side, a narrow flexible conductor 146, an end plate 148 which bends an internal wiring at 90° and makes holes 147, a wide flexible conductor 149, an end plate 152 which makes bolt holes 151 on the door side. The section of the main part is structured as shown in FIG. 9.

The narrow flexible conductor 153, as shown in FIG. 9, includes six signal lines 155 and two driving lines 156 which are fixed by resin laminate 157 in a state where they are arranged in parallel. The wide flexible conductor 149, as shown in FIG. 10, includes six signal lines 155 and two driving lines 156 which are fixed by a flexible resin belt 158 in a state where they are arranged in parallel. It should be noted that the flexible resin belt 158 is approximately twice as high as the resin laminate 157.

FIG. 11 shows another example 150 of the wide flexible conductor. The wide flexible conductor 150 includes the narrow flexible conductor 153 and two thin resin plates 150a bonded on both sides thereof.

An explanation will be given of the effects of the flexible conductor when the slide door 102 is opened or closed.

The flexible conductor 140 shown in FIG. 8 is bent in a U-shape when viewed in plan (FIG. 7). The one end thereof follows the movement of the slide door 102 while its bending position varies.

In this case, since the flexible belt 158 (FIG. 10) is about twice as high as the resin laminate 157, it has an extremely large sectional coefficient and sectional secondary moment. Therefore, the flexible belt 158 is difficult to warp and loose shape.

The flexible belt 158 overlaps the vertical wall of the guide groove 127 in contact with each other (FIG. 6). Therefore, even if the flexible conductor 140 is horizontally inclined slightly when the slide door 102 is opened or closed, it does not come off the guide groove 127.

Further, even if the bottom of the flexible belt 158 wears owing to its sliding friction with the floor 128 (FIG. 6), the signal line 155 and driving line 156 (FIG. 10) are not naked.

In order to protect the signal line 155 and driving line 156 when the slide door 102 is opened or closed, the prior art shown in FIGS. 6 to 11 adopts the structure of fixing these lines by the resin laminate 157 and the flexible belt 158.

However, in such a structure, it is necessary to assure a sufficient space for arranging the flexible belt 158 in a vertical direction of a car. Such a space can be assured in the lower rail 125 (FIG. 6) on which the side roll 122 moves. The structure according to the prior art cannot be applied to all mechanical components.

In addition, it is guessed that the flexible conductor 140 as shown in FIG. 8 is manufactured by individually resin-molding the respective components, i.e. narrow flexible conductors 153, 146, wide flexible conductor 149, and end plates 148, 152. This technique requires a large number of man-hours, thus leading to increase in cost.

Further, the wide flexible conductor 149 is difficult to warp as described above and the rigidity thereof is also unbalanced in its width direction. Therefore, when the opening/closing operation is repeated, the flexible conductor 149 becomes deformed gradually. This may interfere with power supply to and the opening/closing operation of the slide door 102. Furthermore, the flexible conductor 149 does not have the excellent bending or sliding characteristic like a flexible flat cable which have been widely used.

In the future, it is expected that the number of the signal lines is increased owing to necessity of various kinds of signals to be transmitted to the slide door 102. This requires the design to be changed for assuring the arranging space in a vertical direction of the car.

Thus, the above prior art, which intends to protect the signal line 155 and driving line 156 in a manner of fixing them using the flexible belt 158 or the like, encounters the various problems described above.

Accordingly, it is demanded to provide a new protection structure for lengthening the life of the flexible flat cable using its advantage.

SUMMARY OF THE INVENTION

An object of the present invention is to provide a protection structure for a flexible flat cable which can lengthen its life in a simple structure.

In order to attain the above object, in accordance with the present invention, there is provided a protection structure of a flexible flat cable which is arranged in a single or multiple layers between a fixed member and a movable member which can move relatively to the fixed member, comprising: a plate member having flexibility which can follow the operation of the FFC, the plate member being arranged along the FFC, and a heat-shrinkable tube covering both FFC and plate member.

In this configuration, the plate member has flexibility enough to follow the movement of the FFC, the FFC can maintain the excellent property such as bending.

The plate member prevents the FFC from buckling or deforming when the slide door which is movable moves. Further, since the plate member is not attached but arranged in parallel to the FFC, stress is not concentrated to the plate member. If the plate member is locally attached to the FFC, the stress is concentrated to the held plate member.

The above and other objects and features of the present invention will be more apparent from the following description taken in conjunction with the accompanying drawings.

DESCRIPTION OF THE PREFERRED EMBODIMENTS

Figure 1:
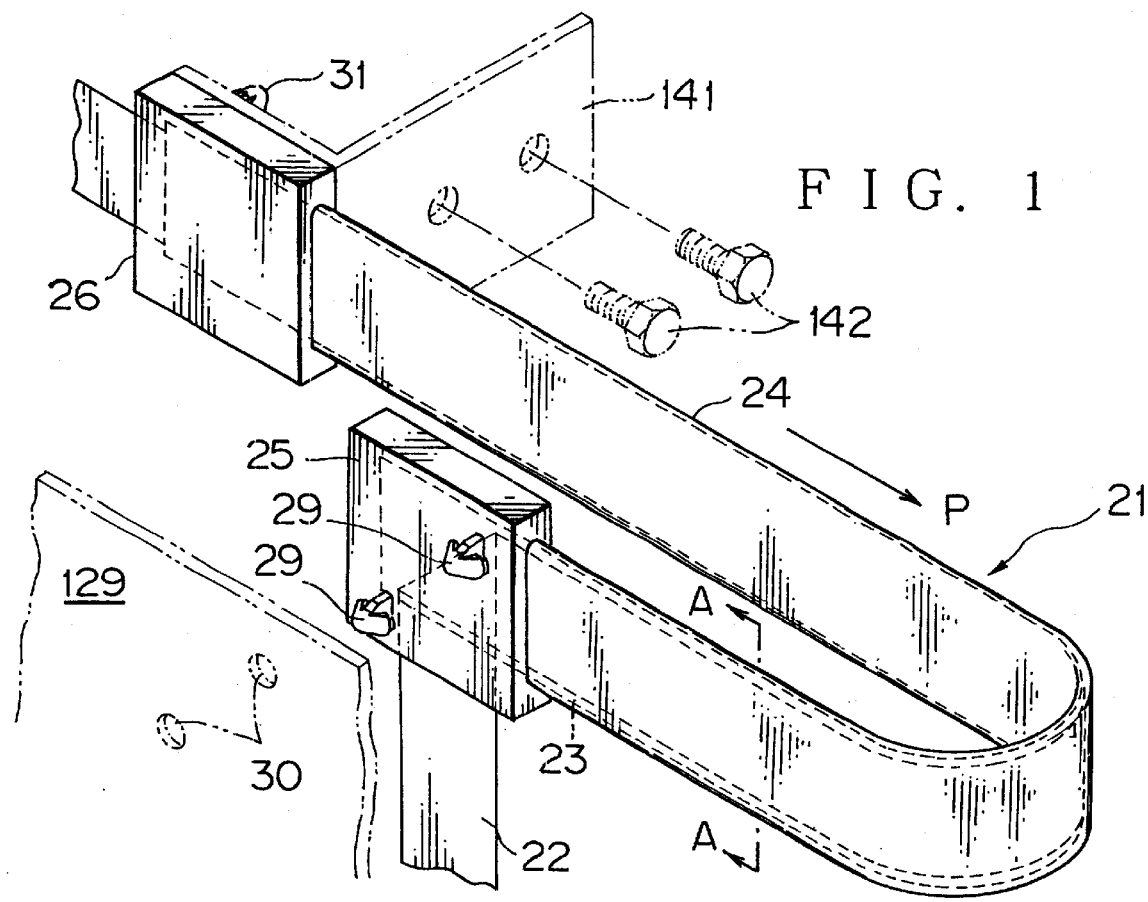
FIG. 1 is a perspective view of one embodiment of the protection structure of a flexible flat cable according to the present invention.
Figure 2:
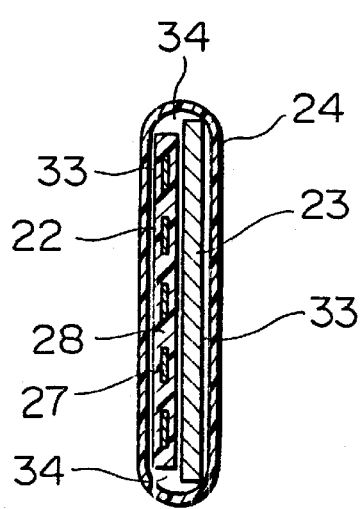
FIG. 2 is a sectional view taken in line A—A in FIG. 1.

Now referring to the drawings, an explanation will be given of an embodiment of the present invention. FIG. 1 is a perspective view of one embodiment of the protection structure of a flexible flat cable according to the present invention. FIG. 2 is a sectional view taken in line A—A in FIG. 1. In these figures, like reference numerals refer to like elements in illustration of the prior art.

In FIG. 1, a flexible conductor 21 is composed of a flexible flat cable 22, a plate member 23 arranged in parallel thereto, a heat-shrinkable tube 24 covering the flat cable 22 and plate member 23, a portion 25 attached to the back wall 129 on the side of the car body 130 (FIG. 6) which is a fixed member, a portion 26 attached to the lower arm 121 through an L metal fitting 141 on the side of the slide door 102 (FIG. 6) which is a movable member. The heat shrinkable tube 24 is adapted to protect the flexible flat cable 22 and the plate member 23 is adapted to prevent the buckling of the flexible flat cable 22 or deformation thereof due to external force.

Figure 6:
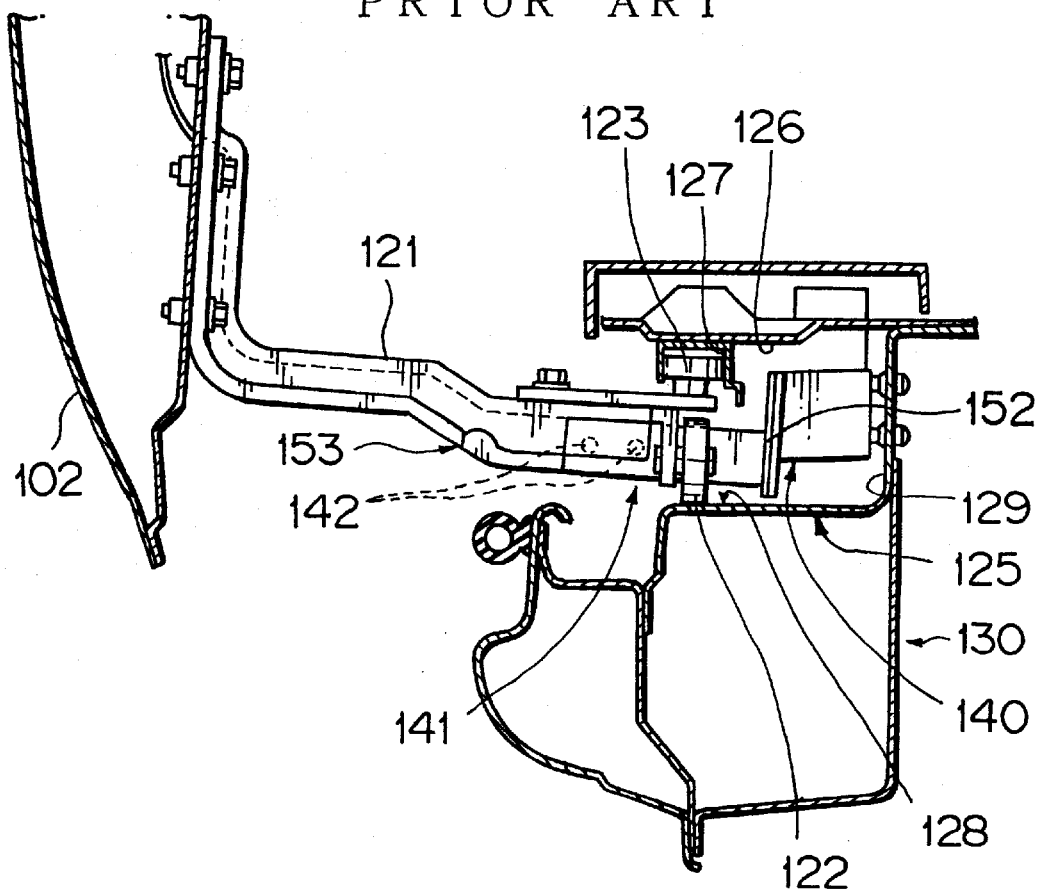
FIG. 6 is a sectional view for explaining the protection structure of a conventional flexible flat cable.
Figure 8:
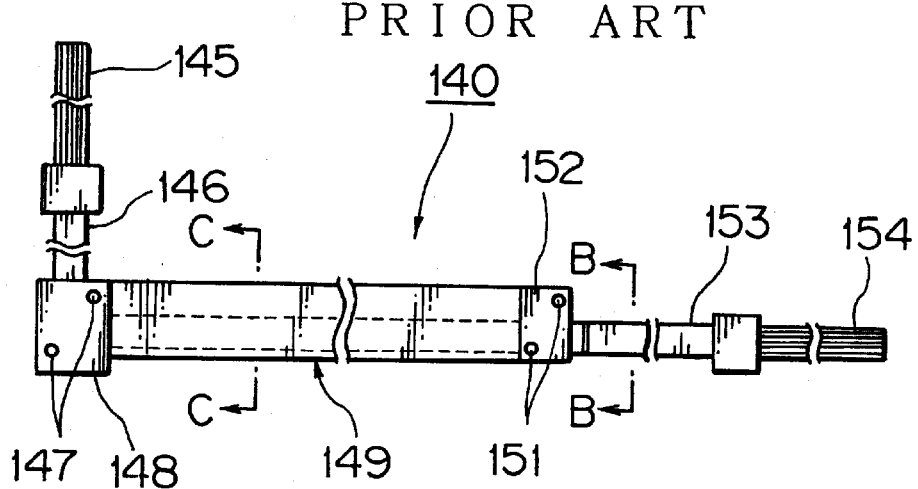
FIG. 8 is a front view of the flexible conductor shown in FIG. 6.
Figure 7:
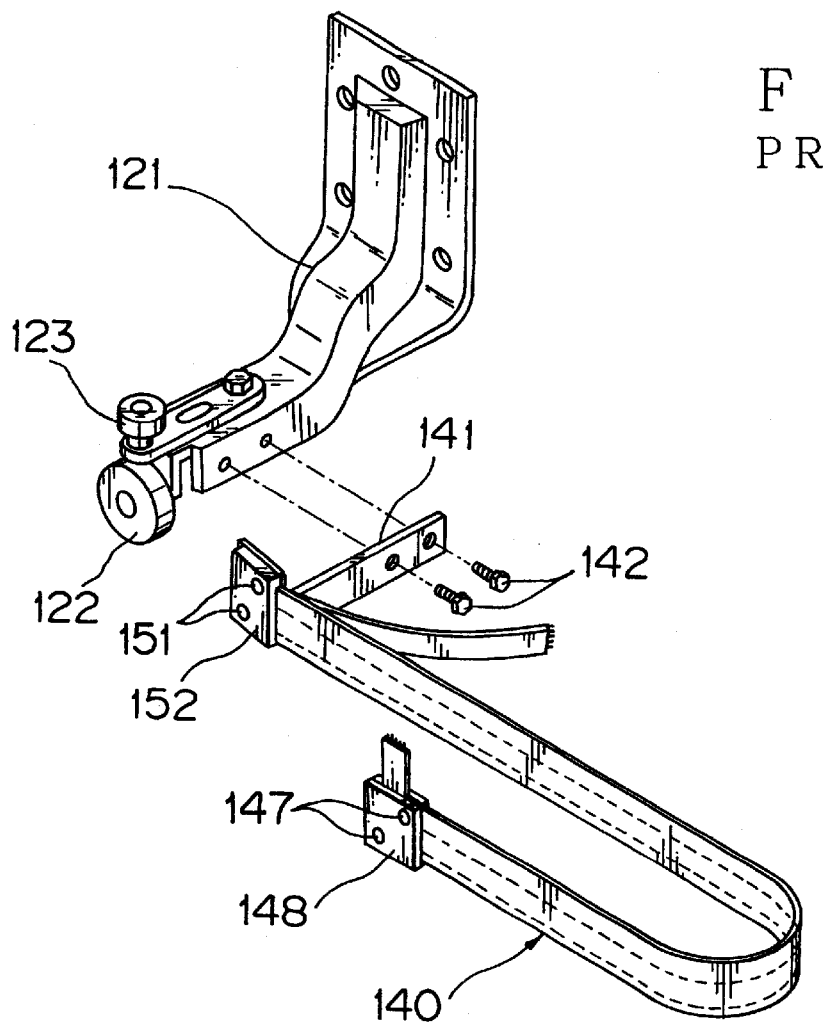
FIG. 7 is a perspective view of a lower arm and flexible conductor shown in FIG. 6.
Figure 10:
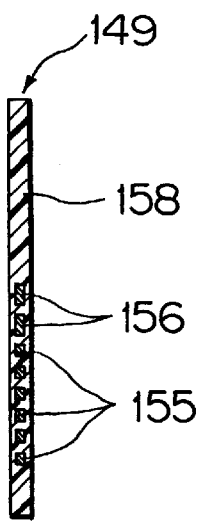
FIG. 10 is a sectional view taken in line C—C in FIG. 8.
Figure 9:
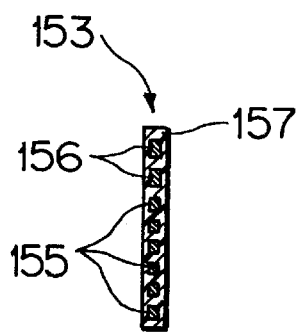
FIG. 9 is a sectional view taken in line B—B in FIG. 8.

A further detailed explanation will be given of the structure of the flexible conductor 21. As seen from FIG. 2, the flexible flat cable 22 is flexibly formed in such a manner that a plurality of conductor plates 27 of good conductor metal (the number thereof should not be limited to five illustrated in FIG. 2) are embedded in an insulating portion 28 made of insulating resin. Further, as seen from FIG. 1, the FFC 22, which is shaped in a belt having a length enough to implement the function inclusive of power supply, is arranged between the car body 130 (FIG. 6) and slide door 102 (FIG. 6).

The plate member 23 is a belt-shaped plate made of metal or synthetic resin. The plate member 23 has a knee (rigidity) enough to avoid the buckling of the FFC 22 and also flexibility enough to follow the movement of the FFC 22.

As seen from FIG. 2, the plate member 23 has a slightly larger width (in the direction orthogonal to a longitudinal direction) than that of the FFC 22 (in the direction orthogonal to a longitudinal direction).

The heat-shrinkable tube 24 is made of heat-shrinkable synthetic resin or rubber having flexibility. The heat-shrinkable tube 24 has a smaller length than the plate member 23 in their longitudinal direction.

The portion 25 is a molded product of synthetic resin, and has a square shape when viewed from the top. The portion 25 seals integrally the one end of each of the plate member 23 and heat-shrinkable tube 24. On the side of the car body 130 (FIG. 6), umbrella-shaped clips 29 protrude. These clips 29 are engaged with holes 30 made in the back wall 129.

Likewise, the portion 26 is also a molded product of synthetic resin, and has a square shape when viewed from the top. The portion 26 seals integrally the other end of each of the plate member 23 and heat-shrinkable tube 24. On the side of the slide door 102 (FIG. 6), umbrella-shaped clips 31 protrude (only one is shown). These clips 31 are engaged with holes (not shown) made in one piece of the L metal fitting 141.

In place of providing the clips 29 and 31 on the portions 25 and 26, holes (not shown) to be bolted may be made.

The direction of the FFC 22 to be extended from the portions 25 and 26 can be suitably determined in accordance with the specification of the fixed member and movable member.

Now referring to the drawings, an explanation will be given of the process for assembling the flexible conductor 21.

Figure 3:
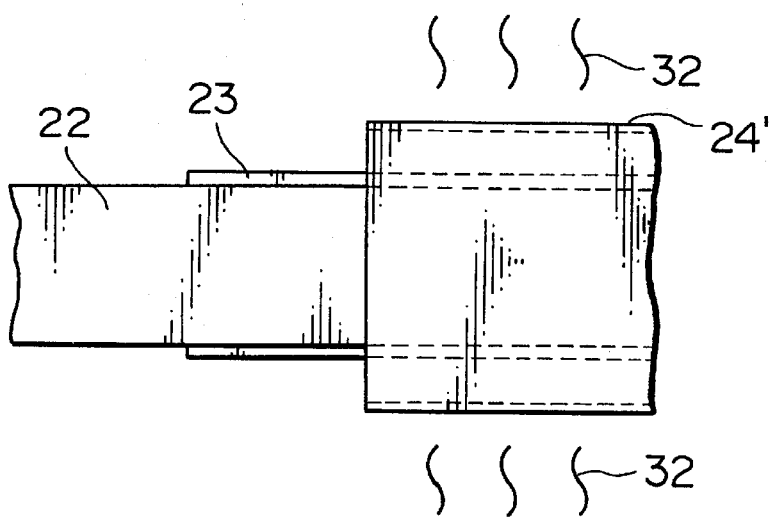
FIG. 3 is a view for explaining the state where a heat shrinkable tube is inserted into a flexible flat cable and a plate member when flexible conductor is assembled.

As shown in FIG. 3, the plate member 23 is arranged along the extending direction (the above longitudinal direction) of the FFC 22. A heat-shrinkable tube 24' before heat-shrunk is fit over-these plate member 23 and FFC 22.

The heat-shrinkable tube 24' is previously cut so that its length is shorter than the plate member 23 in their longitudinal direction.

The heat-shrinkable tube 24' thus fit is externally supplied with heat 32 enough to shrink the tube 24'.

In this case, the heat-shrinkable tube 24 is preferably shrunk to produce a space 33 and a space 34 resulting from a difference between the FFC 22 and the plate member 23 in their widths as seen from FIG. 2. Also it can be seen that plate member 23 remains in a flat condition while covered with the heat-shrinkable tube 24.

Finally, as seen from FIG. 1, the portions 25 and 26 are integrally molded so that the ends of the plate member 23 and the heat-shrinkable tube 24 shrunk are fixed to each other.

Figure 4:
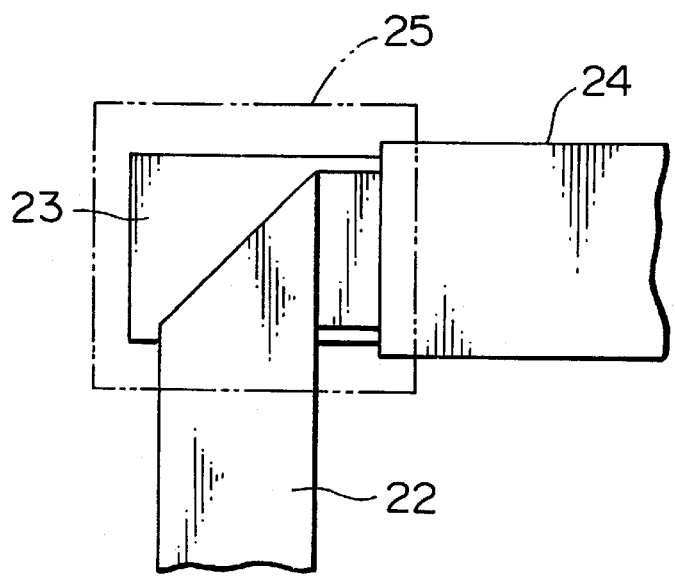
FIG. 4 is a view for explaining the state where the portion to be fixed is shaped on the side of a fixing member when the flexible conductor of FIG. 1 is assembled.
Figure 11:
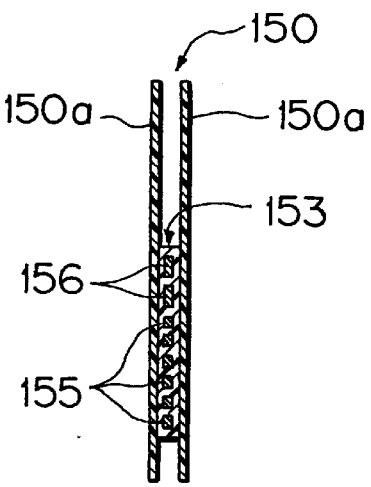
FIG. 11 is a sectional view of another example of the flexible conductor.

It should be noted that the portion 25, as seen from FIG. 4, is formed after the FFC cable 22 is bent to change direction by 90° at an area from the heat-shrinkable tube 24 to that of the plate member 22.

Now referring to FIG. 1, an explanation will be given of the function of the flexible conductor 21.

The portion of the flexible conductor 21 covered with the heat-shrinkable tube 24 is arranged in a state bent in U-shape when viewed from the top. As the slide door 102 (FIG. 6) which is a movable member moves e.g. in a direction of arrow P, the bending portion also moves. In this case, the FFC 22 does not buckle nor deform because of the provision of the plate member 23. In addition, such a state is maintained in the use for a long time.

The protection structure of the FFC 22 is structured so that the FFC cable 22 and the plate member 23 arranged in parallel are covered with the heat-shrinkable tube 24.

In addition, the plate member 23 has flexibility enough to follow the movement of the FFC 22, the FFC 22 can maintain the excellent property such as bending.

The plate member 23 prevents the FFC 22 from buckling or deforming when the slide door 102 (FIG. 6) which is movable moves. Further, since the plate member 23 is not attached but arranged in parallel to the FFC 22, stress is not concentrated to the plate member 23. If the plate member is locally attached to the FFC 22, the stress is concentrated to the held plate member.

On the other hand, the FCC 22 and plate member 23 are covered with the heat-shrinkable tube 24 (24'). For this reason, even when the movable member (slide door 102) in being contact with an external component, the FFC 22 will not wear out, but can be used for a long time.

As described above, the FFC 22 can be protected in a very simple structure. This structure can be also manufactured without undergoing any complicated process, thereby reducing the production cost.

The flexible conductor 21 can be formed with a minimum width in a width direction of the FFC 22 so that it can be arranged in a smaller space then in the prior art.

The end of the heat-shrinkable tube 24 as well as that of the plate member 23 is fixed to each of the portions 25 and 26 so that the local means for locally holding the FFC 22 on which stress may be concentrated may not be provided.

The portions 25 and 26 are molded from synthetic resin so that great force is not applied to the FFC 22 itself. Therefore, the ends can be easily fixed to the portions 25 and 26.

As seen from FIG. 4, the ends of the plate member 23 are fixed to the portions 25 and 26 at longer length than the ends of the heat-shrinkable tube 24 are. Therefore, the direction of the FFC 22 can be easily changed by bending at the end of the heat-shrinkable tube 24. Further, when the portions 25 and 26 are molded, the ends of the plate member 23 serve as a wall or supporting member, thereby preventing deviation of the FFC 22 due to the molding pressure.

Further, the width of the plate member 23 is larger than that of the FFC 22 so that when the heat-shrinkable tube 24' is heat-shrunk, slight spaces 34 between the edges of them are formed. In addition, slight spaces 33 are formed between the surface of the FFC 22 and plate member 23 and the inner wall of the heat-shrinkable tube 24. For this reason, when the movable member is repeatedly moved in one or two-dimensional arrangement, the heat-shrinkable tube 24 serves as a protection member for the FFC 22. Thus, the FFC 22 can be used for a long time without losing its excellent property.

In accordance with the protection structure for the FFC, even when the movable member is repeatedly moved in a one or two dimensional arrangement, the buckling, deform or wearing of the FFC does not occur. This contributes to lengthen the life of the FFC and maintain the excellent property such as flexion. In addition, the protection structure itself can be simplified to improve its productivity.

Figure 5:
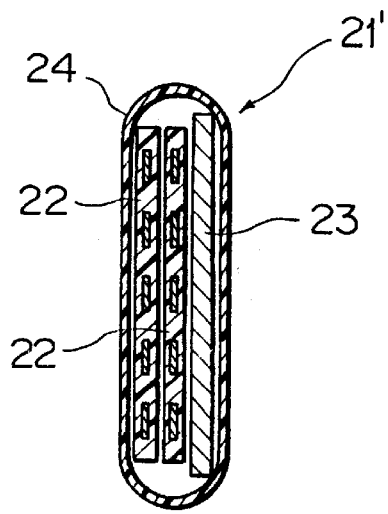
FIG. 5 is a sectional view of another embodiment of a flexible conductor which is illustrated at the same position as in FIG. 1.

Referring to FIG. 5, an explanation will be given of another embodiment of the present invention.

FIG. 5 shows a section of a flexible conductor 21' in which plural layers of FFCs 22 are laminated with the remaining structure being the same as the previous embodiment.

In the structure in which the FFCs 22 laminated and the plate member 23 arranged in parallel thereto are covered with the heat-shrinkable tube 24, several kind of signals can be transmitted to the movable member (not shown).

Additionally, the FFCs 22 may be arranged in parallel to both sides of the plate member 23.

In short, in the protection structure for the FFC in which the FFC 22 is protected by the plate member 23 and the heat-shrinkable 24 (24'), it may be provided in a single or multiple layers.

In this embodiment also, the FFCs can be arranged in a smaller space than the prior art.

It is needless to say that the present invention can be implemented in various modifications without changing the spirit of the invention.

The protection structure of the FFC can be applied to mechanical components (household electrical appliances) each having a movable member.

As described above, although the plate member 23 has a larger width than that of the FFC 22, it can be shortened as long as it has a knee enough to avoid the buckling of the FFC 22.

Although the plate member 23 is formed in a flat shape, but a slit (not shown) may be provided along the longitudinal direction to lower the rigidity so that the plate member 23 can follow the operation of the FFC 22 smoothly.

The FFC 22 may be partially covered with a heat shrinkable tube 24 (e.g. only the operation range of the bending portion of the FFC 22). In place of the heat-shrinkable tube 24, a flat-crushed tube of synthetic resin or rubber is used and the FFC 22 and plate member 23 may be passed through the FFC.

What is claimed is:

1. A protection structure for a flexible flat cable (FFC) which is arranged in a single or multiple layers, between a fixed member and a movable member which can move relatively to the fixed member, comprising:

a flat plate member having flexibility which can follow the operation of the FFC, said plate member being arranged along said FFC and having a width greater than that of said FFC, and a heat-shrinkable tube covering both said FFC and said plate member, said flat plate member remaining in a flat condition while covered with said heat-shrinkable tube.

2. A protection structure for a flexible flat cable as claimed in claim 1, wherein ends of said heat-shrinkable tube and said plate member are fixed to portions to be secured to the fixed member and movable member.

3. A protection structure for a flexible flat cable (FFC) which is arranged in a single or multiple layers, between a fixed member and a movable member which can move relatively to the fixed member, comprising:

a plate member having flexibility which can follow the operation of the FFC, said plate member being arranged along said FFC, a heat-shrinkable tube covering both said FFC and said plate member, said heat-shrinkable tube and said plate member ends being fixed to portions to be secured to the fixed member and movable member, and ends of said plate member being fixed to said portions in a longer length than the ends of said heat-shrinkable tube are.

4. A protection structure for a flexible flat cable as claimed in claim 3, wherein the plate member has a longer width than that of said FFC, and when said heat-shrinkable tube is heat-shrunk, within said heat-shrinkable tube, a slight space is formed from both edges of the FFC to those of the plate member in their width directions.

5. A protection structure for a flexible flat cable (FFC) which is arranged in a single or multiple layers, between a fixed member and a movable member which can move relatively to the fixed member, comprising:

a plate member having flexibility which can follow the operation of the FFC, said plate member being arranged along said FFC, a heat-shrinkable tube covering both said FFC and said plate member, and said plate member having a longer width than that of said FFC, and when said heat-shrinkable tube is heat-shrunk, within said heat-shrinkable tube, a slight space is formed from both edges of the FFC to those of the plate member in their width directions.

6. A protection structure for a flexible flat cable (FFC) which is arranged in a single or multiple layers, between a fixed member and a movable member which can move relatively to the fixed member, comprising:

a plate member having flexibility which can follow the operation of the FFC, said plate member being arranged along said FFC, a heat-shrinkable tube covering both said FFC and said plate member, said heat-shrinkable tube and ends of said plate member being fixed to portions to be secured to the fixed member and movable member, and said plate member having a longer width than that of said FFC, and when said heat-shrinkable tube is heat-shrunk, within said heat-shrinkable tube, a slight space is formed from both edges of the FFC to those of the plate member in their width directions.

* * * * *